(12) United States Patent
Vanderbeck et al.

(10) Patent No.: US 9,945,668 B2
(45) Date of Patent: Apr. 17, 2018

(54) TUNNEL CONVERGENCE DETECTION APPARATUS AND METHOD

(71) Applicant: Queen's University at Kingston, Kingston (CA)

(72) Inventors: Robert Lindsay Vanderbeck, Fort McMurray (CA); Joshua A. Marshall, Kingston (CA)

(73) Assignee: Queen's University at Kingston, Kingston, ON (CA)

(*) Notice: Subject to any disclaimer, the term of this patent is extended or adjusted under 35 U.S.C. 154(b) by 0 days.

(21) Appl. No.: 15/471,802

(22) Filed: Mar. 28, 2017

(65) Prior Publication Data

US 2017/0284801 A1    Oct. 5, 2017

Related U.S. Application Data

(60) Provisional application No. 62/314,739, filed on Mar. 29, 2016.

(51) Int. Cl.
| | |
|---|---|
| *G01B 11/14* | (2006.01) |
| *G01C 15/00* | (2006.01) |
| *G02B 26/10* | (2006.01) |
| *G01S 17/89* | (2006.01) |
| *E21D 9/14* | (2006.01) |
| *B60R 11/04* | (2006.01) |

(52) U.S. Cl.
CPC ............ *G01C 15/002* (2013.01); *E21D 9/14* (2013.01); *G01S 17/89* (2013.01); *G02B 26/10* (2013.01); *B60R 11/04* (2013.01); *G01C 15/00* (2013.01)

(58) Field of Classification Search
CPC ...... G01C 15/002; G01C 15/00; G02B 26/10; G01S 17/89; E21D 9/14; B60R 11/04
USPC .................................................. 356/601–623
See application file for complete search history.

(56) References Cited

U.S. PATENT DOCUMENTS

| | | | |
|---|---|---|---|
| 7,995,054 B2* | 8/2011 | Wheeler ............ | G06K 9/00201 345/419 |
| 2009/0043439 A1* | 2/2009 | Barfoot .................... | G08G 1/20 701/25 |
| 2012/0162372 A1* | 6/2012 | Ghyme ................. | G06T 19/006 348/46 |
| 2016/0333691 A1* | 11/2016 | Puura ...................... | G01S 17/42 |
| 2017/0352127 A1* | 12/2017 | Becker ................. | G06T 3/0087 |

* cited by examiner

*Primary Examiner* — Hoa Pham
(74) *Attorney, Agent, or Firm* — Stephen J. Scribner (57) ABSTRACT

Provided are methods and products for rapid, reliable, and accurate monitoring and detecting of convergence in mining and civil engineering applications. A sensor, such as a scanning laser device, is moved through a tunnel, either automatically, autonomously, or with manual guidance. The sensor is configured to acquire 3D point clouds of all or a portion of a tunnel, at selected times. The 3D point cloud data is used to compute a set of indicators, which are local descriptors of the environment along the tunnel. The indicators are then amalgamated to estimate the probability that convergence has occurred in a given region. In one embodiment, the indicators are fused together using a Bayes network.

22 Claims, 10 Drawing Sheets

Fig. 8A (rotational change)

Fig. 8B (signal representation)

| Conditional Probabilities | Indicators | | | |
|---|---|---|---|---|
| | Spectral Analysis | Area | PCA | Perimeter |
| P(++\|++C) | 0.9 | 0.8 | 0.75 | |
| P(+\|++C) | 0.09 | 0.15 | 0.2 | |
| P(¬\|++C) | 0.01 | 0.05 | 0.05 | |
| P(++\|+C) | 0.05 | 0.1 | 0.125 | |
| P(+\|+C) | 0.9 | 0.8 | 0.75 | |
| P(¬\|+C) | 0.05 | 0.1 | 0.125 | 0.2 |
| P(++\|¬C) | 0.01 | 0.05 | 0.05 | 0.1 |
| P(+\|¬C) | 0.09 | 0.15 | 0.2 | 0.3 |
| P(¬\|¬C) | 0.9 | 0.8 | 0.75 | 0.6 |

Fig. 11

| World | Convergence | Sepctral Analysis | Area | PCA | Perimeter | Joint Probabilities |
|---|---|---|---|---|---|---|
| 1 | TRUE | TRUE | TRUE | TRUE | TRUE | 0.16416 |
| 2 | TRUE | TRUE | TRUE | TRUE | FALSE | 0.24624 |
| 3 | TRUE | TRUE | TRUE | FALSE | TRUE | 0.04104 |
| 4 | TRUE | TRUE | TRUE | FALSE | FALSE | 0.06156 |
| 5 | TRUE | TRUE | FALSE | TRUE | TRUE | 0.01824 |
| 6 | TRUE | TRUE | FALSE | TRUE | FALSE | 0.02736 |
| 7 | TRUE | TRUE | FALSE | FALSE | TRUE | 0.00456 |
| 8 | TRUE | TRUE | FALSE | FALSE | FALSE | 0.00684 |
| 9 | TRUE | FALSE | TRUE | TRUE | TRUE | 0.00864 |
| 10 | TRUE | FALSE | TRUE | TRUE | FALSE | 0.01296 |
| 11 | TRUE | FALSE | TRUE | FALSE | TRUE | 0.00216 |
| 12 | TRUE | FALSE | TRUE | FALSE | FALSE | 0.00324 |
| 13 | TRUE | FALSE | FALSE | TRUE | TRUE | 0.00096 |
| 14 | TRUE | FALSE | FALSE | TRUE | FALSE | 0.00144 |
| 15 | TRUE | FALSE | FALSE | FALSE | TRUE | 0.00024 |
| 16 | TRUE | FALSE | FALSE | FALSE | FALSE | 0.00036 |
| 17 | FALSE | TRUE | TRUE | TRUE | TRUE | 0.00024 |
| 18 | FALSE | TRUE | TRUE | TRUE | FALSE | 0.00016 |
| 19 | FALSE | TRUE | TRUE | FALSE | TRUE | 0.00096 |
| 20 | FALSE | TRUE | TRUE | FALSE | FALSE | 0.00064 |
| 21 | FALSE | TRUE | FALSE | TRUE | TRUE | 0.00216 |
| 22 | FALSE | TRUE | FALSE | TRUE | FALSE | 0.00144 |
| 23 | FALSE | TRUE | FALSE | FALSE | TRUE | 0.00864 |
| 24 | FALSE | TRUE | FALSE | FALSE | FALSE | 0.00576 |
| 25 | FALSE | FALSE | TRUE | TRUE | TRUE | 0.00456 |
| 26 | FALSE | FALSE | TRUE | TRUE | FALSE | 0.00304 |
| 27 | FALSE | FALSE | TRUE | FALSE | TRUE | 0.01824 |
| 28 | FALSE | FALSE | TRUE | FALSE | FALSE | 0.01216 |
| 29 | FALSE | FALSE | FALSE | TRUE | TRUE | 0.04104 |
| 30 | FALSE | FALSE | FALSE | TRUE | FALSE | 0.02736 |
| 31 | FALSE | FALSE | FALSE | FALSE | TRUE | 0.16416 |
| 32 | FALSE | FALSE | FALSE | FALSE | FALSE | 0.10944 |
| | | | | | Total | 1.00000 |

Fig. 12

TUNNEL CONVERGENCE DETECTION APPARATUS AND METHOD

RELATED APPLICATIONS

This application claims the benefit of the filing date of application Ser. No. 62/314,739, filed on Mar. 29, 2016, the contents of which are incorporated herein by reference in their entirety.

FIELD

The invention relates to products and methods for monitoring and detecting convergence in mining and civil engineering applications. More particularly, the invention relates methods and products that provide fast, reliable, and accurate monitoring and detecting of convergence in mining and civil engineering applications, such as in tunnels, excavations, and structures.

BACKGROUND

Figure 1A:
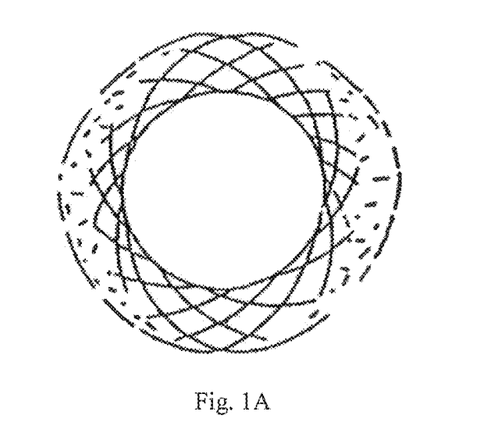
FIGS. 1A-1C are schematic representations showing examples of convergence: complete shear failure; buckling failure; and tensile splitting, shearing, and sliding, respectively, in underground excavations.
Figure 1B:
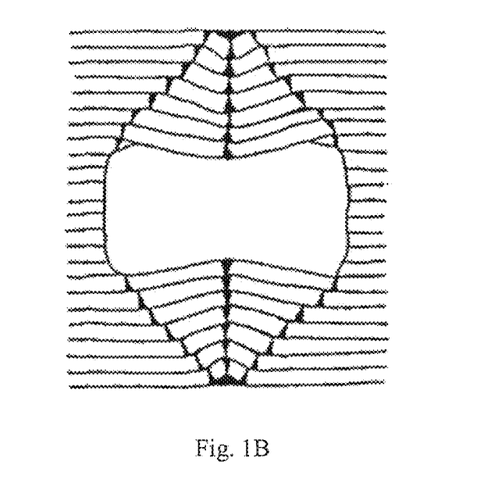
Figure 1C:
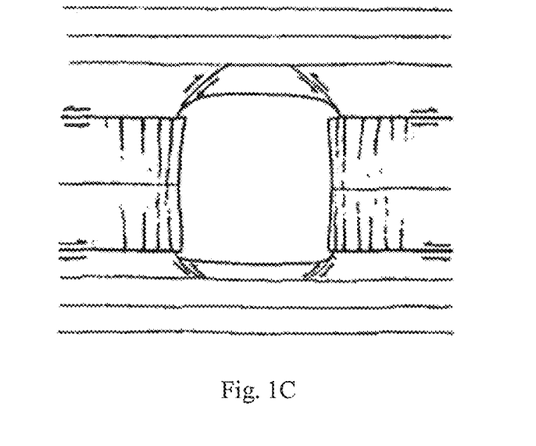

When underground openings are created (e.g., tunnels, cavities, stopes, drifts, etc.) stresses are redistributed around the opening, which usually results in some ground/rock movement. If the movement is very sudden, a rock burst may occur. Convergence (i.e., squeezing) is the movement of rock gradually over time. FIGS. 1A-1C are diagrams showing three examples of how convergence often manifests itself in underground excavations.

In practice, mine or tunnel operators usually attempt to monitor (e.g., measure) ground movements in order to predict and/or avoid failures before they become unsafe. In many cases, convergence is not visible to the naked eye in the sense that tunnels may change in shape/move only millimetres or centimetres over long periods of time (e.g., weeks, months, or years).

Current techniques for monitoring convergence in underground excavations involve the installation of fixed infrastructure, such as a set of markers (e.g., reflective prisms). The positions of the markers are checked relative to each other by a systematic method for movement. Or, infrastructure may include the use of borehole extensometers, used to directly measure the movement of rock. Disadvantages of these existing methods include the fact that convergence is monitored only at specific and discrete locations, where infrastructure has been installed. This means that only select and few locations are monitored for convergence, rather than broad tunnel-wide or mine-wide coverage. Moreover, in some cases, measurements by existing methods can be laborious (i.e., a person must repeatedly return to manually capture measurements). Some instrumented extensometers are more automated for data collection, but they are costly and still suffer from the disadvantage noted above.

SUMMARY

One aspect of the invention relates to an apparatus for detecting tunnel convergence; comprising:
at least one platform including at least one scanning device that is configured to acquire 3D point cloud data of an interior of the tunnel;
a processor that:
determines a set of one or more indicators from 3D point cloud data for the tunnel acquired at a first time;
identifies the set of one or more indicators in 3D point cloud data for the tunnel acquired at at least a second time;
amalgamates the sets of one or more indicators;
compares the indicators in the amalgamated sets at the first and at least second times; and
outputs a result indicative of a change or no change in one or more indicators since the first time.

According to various embodiments, the processor may amalgamate each set of indicators according to a directed graphical model, or a Bayesian model.

In one embodiment, the output may comprise a probability that tunnel convergence has occurred.

In one embodiment, the platform may be adapted to be attached to a vehicle.

In various embodiments, the platform may be self-propelled, and may be adapted to be guided through the tunnel using remote control or autonomously.

In various embodiments, the at least one scanning device may comprise a laser scanning device or a rangefinder device.

Another aspect of the invention relates to a method for detecting tunnel convergence; comprising:
acquiring 3D point cloud data of an interior of the tunnel;
using a processor to:
determine a set of one or more indicators from 3D point cloud data for the tunnel acquired at a first time;
identify the set of one or more indicators in 3D point cloud data for the tunnel acquired at at least a second time;
amalgamate the sets of indicators;
compare the indicators in the amalgamated sets at the first and at least second times; and
output a result indicative of a change or no change in one or more indicators since the first time.

The method may comprise amalgamating each set of indicators according to a directed graphical model. The model may be a Bayesian model.

The method may include outputting a probability that tunnel convergence has occurred.

The method may include deploying at least one platform including at least one scanning device that is configured to acquire 3D point cloud data of an interior of the tunnel.

In one embodiment, the method may comprising attaching the platform to a vehicle.

In one embodiment, the platform may be self-propelled.

One embodiment may include guiding the platform through the tunnel autonomously or using remote control.

In one embodiment, the method comprises using at least one laser scanning device.

In one embodiment, the method comprises using at least one rangefinder device.

Another aspect of the invention relates to a non-transitory computer-readable medium for detecting tunnel convergence, comprising instructions stored thereon, that when executed on a processor, perform one or more steps selected from:
inputting 3D point cloud data of an interior of a tunnel;
determining a set of one or more indicators from the 3D point cloud data for the tunnel acquired at a first time;
identifying a set of one or more indicators in the 3D point cloud data for the tunnel acquired at at least a second time;
amalgamating the sets of one or more indicators;
comparing the indicators in the amalgamated sets at the first and at east second times; and
outputting a result indicative of a change or no change in one or more indicators since the first time.

In one embodiment of the non-transitory computer-readable medium, the processor amalgamates each set of indicators according to a directed graphical model.

In one embodiment of the non-transitory computer-readable medium, the processor amalgamates each set of indicators according to a Bayesian model.

In one embodiment of the non-transitory computer-readable medium, the output comprises a probability that tunnel convergence has occurred.

According to various aspects and embodiments of the invention, the tunnel may be associated with a mine.

BRIEF DESCRIPTION OF THE DRAWINGS

To better understand the invention, and to show more clearly how it may be carried into effect, embodiments will be describe, by way of example, with reference to the accompanying drawings, wherein.

radians.

DETAILED DESCRIPTION OF EMBODIMENTS

As used herein, the term "rock" is intended to include rock, earth, soil, or "ground", that is, any material that may be excavated to create a tunnel. As used herein, "rock" may also include man-made materials such as concrete, and combinations of natural and man-made materials.

As used herein, the term "tunnel" is intended to include any opening in rock, such as, but not limited to, a cavity, stope, drift, or crevice, either human-made (e.g., a mine), or naturally-occurring (e.g., a cave). The term "tunnel" is thus intended to refer to such openings or structures associated with mining and civil engineering applications. The term "tunnel" is intended to include a single tunnel and a network of tunnels.

One aspect of the invention relates to a scanner-based convergence monitoring system that detects and may be configured to warn about the possibility of tunnel convergence. The term "scanner" is intended to include any scanning or sensing device that can generate a three-dimensional (3D) point cloud. Such a device may include laser scanning technology. The system does not require the installation of infrastructure and, unlike prior approaches, monitors convergence over the entire length of a tunnel (or an entire network of tunnels, as in a mine).

In one embodiment, the system comprises at least one platform that is equipped with at least one scanning laser device. The platform may be adapted to move through the tunnel (or network, etc.), either automatically or with manual guidance. For example, the platform may be attached to a vehicle, or the platform may be a mobile platform. The vehicle may be an autonomous vehicle. The scanning laser device may be a rangefinder device. The scanning laser device is configured to acquire 3D point clouds of all or a portion of a tunnel, at selected times. The 3D point cloud data is used by the system to compute a set of indicators, which are local descriptors of the environment along the tunnel. The indicators are then amalgamated to estimate the probability that convergence has occurred in a given region. In one embodiment, the indicators are fused together using a Bayes network.

Thus, unlike prior approaches, the embodiments do not attempt to measure small displacements in rock in order to measure an amount of convergence. The combination or set of indicators that is used in the comparisons, instead of each direct measures, do not provide quantitative information about convergence on their own. However, when the indicators are used together in the analysis they provide a likelihood that convergence has occurred over the period between scans.

Figure 2:
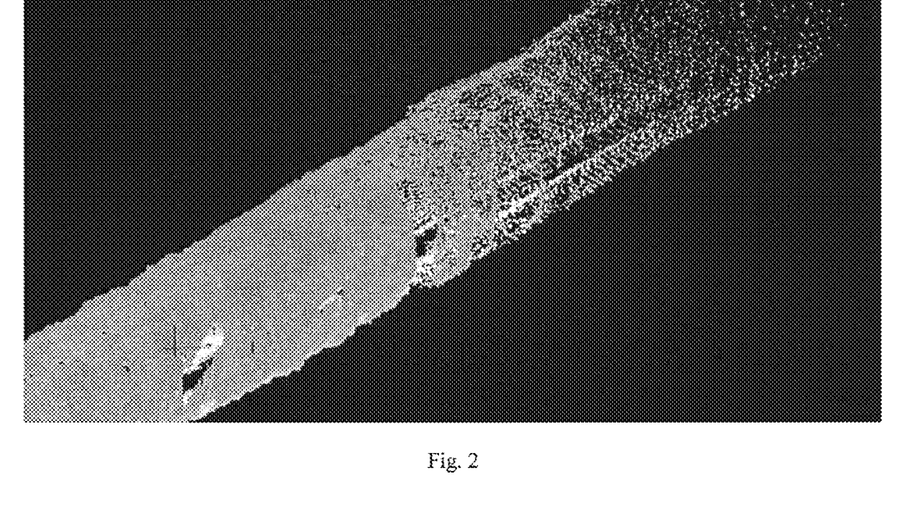
FIG. 2 is an example of a uGPS Rapid Mapper™ point cloud output.

In one embodiment, the scanning laser device may be implemented with a uGPS Rapid Mapper™ (Peck Tech. Consulting Ltd., Montreal, Canada) product, which is a 3D point cloud data collection device designed for creating 3D point cloud maps of underground tunnels and/or mines (see http://ugpsrapidmapper.com). However, other sensors/devices including custom-designed sensors/devices may also be used. FIG. 2 shows an example of a point cloud of a tunnel generated by a uGPS Rapid Mapper device. It can be seen that, for this particular device, the point cloud is made up of spaced, concentric rings.

Another aspect of the invention provides a non-transitory computer-readable medium, comprising instructions stored thereon, that when executed on a processor, direct the processor to perform one or more steps selected from:
    inputting 3D point cloud data of an interior of a tunnel;
    determining a set of one or more indicators from the 3D point cloud data for the tunnel acquired at a first time;
    identifying a set of one or more indicators in the 3D point cloud data for the tunnel acquired at at least a second time;
    amalgamating the sets of one or more indicators;
    comparing the indicators in the amalgamated sets at the first and at least second times; and
    outputting a result indicative of a change or no change in one or more indicators since the first time.

Embodiments may include one or more of Algorithms 1, 2, and 3, described above, or variants or equivalents thereof. Embodiments may implement an algorithm that carries out one or more of the steps of FIG. 9. Embodiments may include a user interface (e.g., a graphical user interface (GUI)), and may include functions such as receiving input (e.g., receiving commands from a user, etc.) to direct the algorithm to carry out operations such as receiving data corresponding to a 3D point cloud, executing one or more processing steps such as those identified above and/or processing steps associated with FIG. 9, and outputting/displaying results, images, reports, etc. on a display screen or other device.

Executing instructions may include the processor prompting the user for input at various steps. In one embodiment the programmed instructions may be embodied in one or more hardware modules or software modules resident in the memory of a data processing system or elsewhere. In one embodiment the programmed instructions may be embodied on a non-transitory computer readable storage medium or product (e.g., a compact disk (CD), etc.) which may be used for transporting the programmed instructions to the memory of a data processing system and/or for executing the programmed instructions. In one embodiment the programmed instructions may be embedded in a computer-readable medium or product that is uploaded to a network by a vendor or supplier of the programmed instructions, and this medium may be downloaded through an interface to a data processing system from the network by an end user or buyer.

Embodiments are further described by way of the following non-limiting example.

EXAMPLE

This example describes technical details of an embodiment of a convergence detection system.

Introduction

The determination of drift convergence involves two distinct steps: 1) indicators are derived from drift cross sectional data; and 2) these indicators are amalgamated into a combined score or probability which indicates whether or not convergence may be prevalent.

The method differs from current LiDAR (light detecting and ranging) scan change-detection algorithms that attempt to directly compare two point clouds acquired at different times. What is different about the current approach is that it instead employs macroscopic observations to infer whether or not convergence is occurring. This has at least two significant advantages: 1) it may produce fewer false positives (because singular errors will not be enough to suggest the presence of convergence); and, 2) the method is inherently robust to uncertainty in the acquired data meaning it does not require a highly-accurate, survey-grade positioning and/or expensive high-accuracy LiDAR system.

Data Structure

The macroscopic changes are extracted from cross sections of scanned mining drifts. First, 3D point cloud data is gridded into a solid drift shell. This feature allows section views to be sliced at any distinguishable area along a drift. Point cloud gridding generates a complete surface using point cloud points. This process is effectively 3D interpolation and may be done with one of many methods, such as, but not limited to, nearest neighbour, inverse distance weighting, triangulation, and Kriging. The solid drift shell allows sections to be cut regardless of the distribution of point cloud points.

The data passing through the section is a 2D line representing the drift perimeter where the section was taken. From here range measurements are defined from a single, arbitrary point within the perimeter of the drift to the drift edge. This transforms the definition of the drift perimeter from Cartesian coordinates to a set of polar ones. This polar coordinate form of data is more advantageous over its Cartesian counterpart because it not only defines the drift shape but also generates a signal plot of range versus angle around the drift. Further advantages may be realized during signal analysis and provide alternative ways to infer convergence.

In the section below, the polar range data is assumed to be sampled at a half degree resolution from the defined reference point. The sweep angle of the sensor is also assumed to cover 360 degrees of rotation, making 720 sample points overall. This defined data structure, although not necessary, was chosen because it can easily be modified to fit the sensor output from the uGPS Rapid Mapper™.

Convergence Indicators

This section describes how the indicators are developed from cross-sectional range data. Five indicators are described.

1. Cross Sectional Area

In converging ground conditions it is expected that the cross sectional area of the drift is going to change. It is likely that the rock will begin swelling into the drift and the void cross sectional area will normally decrease over time.

The data is set up such that the range measurements $R(\theta)$, are sampled every 0.5 degrees $R(d\theta)$, over some sweep angle, $\theta$. To calculate an area from these range values one needs to integrate over the sweep angle of the scanner as in $$A = \int_0^{2\pi} R(\theta) d\theta. \tag{1}$$

The discrete nature of the range values necessitates the change of the integral to a finite sum as in $$A = 0.5 \times \frac{\pi}{180} \sum_{i=1}^{720} R(\theta_i). \tag{2}$$

Figure 3:
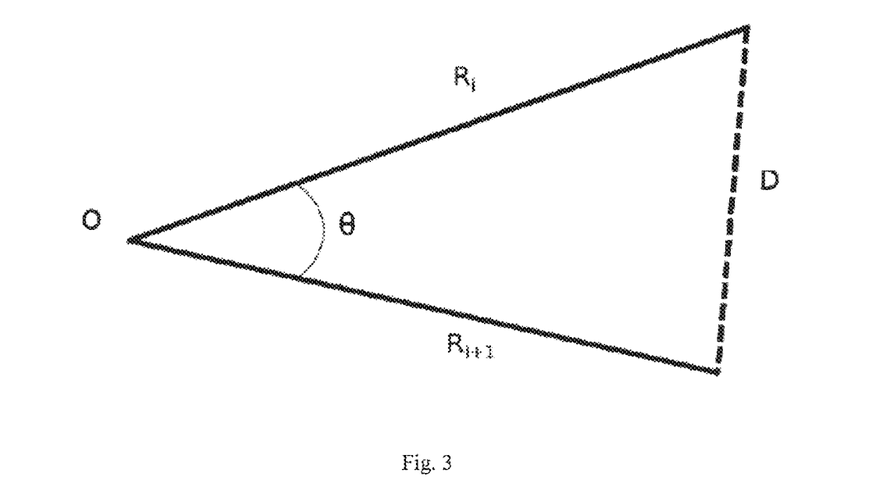
FIG. 3 is a diagram showing how a distance D may be calculated using the cosine law.

During data acquisition, it is possible that some range values would equal 0 or be marked as infinitely long. These values, along with any values that appear to be outliers, are filtered out in an area calculation algorithm. Outliers are defined as any point that is greater than a certain distance from all its neighbouring points. This distance may be calculated using the cosine law $$d = \sqrt{R_i^2 + R_{i+1}^2 - 2R_i R_{i+1} \cos(d\theta)}, \tag{3}$$

where $R_i$ is the range value associated with the point in question and $R_{i+1}$ is the range value of the neighbouring point being compared to. This is shown in FIG. 3. The resulting distance threshold filter is shown, according to one example, in Algorithm 1. Tagged points are then ignored when calculating the summation in Equation (2).

FIG. 3 shows how the perimeter length 1) is calculated using the cosine law and the available measurements from the scanner. Point O is the scanner origin, $\theta$ is the fix angular resolution of 0.5 degrees while $R_i$ and $R_{i+1}$ are the current scan range data and neighbouring scan range data respectively.

---
Algorithm 1 Implementation of a filter which tags points which are
beyond a certain 'distance_threashold' from their neighbours.
---

Input: $R_i$, $R_{i+1}$
Output: $G_{TAGGED}$
 1: function DISTANCE FILTER($R_i$, $R_{i+1}$)
 2:    C ← 0                                ▷ Initialize a counter
 3:    $D = \sqrt{R_i^2 + R_{i+1}^2 + 2(R_i)(R_{i+1})\cos(d\theta)}$    ▷ Compute D with cosine law
 4:    if D > distance_threshold then
 5:        $G_{TAGGED\_C} = i$
 6:    end if
 7: end function This raises yet another problem with the area calculation. If some scan cross sections are using all 720 range values and some are using less, then the area values A will not be directly comparable. That is, if the same cross sectional area were computed with 720 points and then with 700 points, the magnitude of A would be different.

To get around this, the area is divided by the number of points used in the calculation i.e., the number of non-tagged points) and then multiplied by 720, so that each area value is comparable to the true cross sectional area. An example of a pseudo code implementation is shown in Algorithm 2.

---
Algorithm 2

Implementation of the area calculation algorithm with filtered points.
---

Input: R
Output: A
 1: function Area Calculation(R, $G_{TAGGED}$)
 2:    A ← 0                                    ▷ Initialize area variable
 3:    C ← 0                                   ▷ Initialize counting variables
 4:    $C_{total}$ ← 0
 5:    for i = 1 → 720 do
 6:       if i = Any($G_{TAGGED}$) then
 7:          C = C + 1         ▷ Count number of successive, un-TAGGED points
 8:          $C_{total} = C_{total} + 1$      ▷ Count number of total un-TAGGED points
 9:       else if i ≠ Any($G_{TAGGED}$) then     ▷ Sum area with un-TAGGED points
10:          $A = A + R_i \times 0.5 \times \dfrac{\pi}{180} \times C$
11:          C ← 0
12:       end if
13:    end for
14:    $A = \dfrac{A \times 720}{720 - C_{total}}$        ▷ Account for number of un-used range values
15: end function

2. Perimeter

Calculating the perimeter is similar to calculating the area of the drift. Firstly, the data must be filtered, with anomalous points being tagged. If left unfiltered, anomalous points could render the perimeter incorrect by an order of magnitude or more. Next, the perimeter is calculated using the cosine law (Equation 3) applied between neighbouring points $R_i$ and $R_{i+1}$ in FIG. 3. These distances are then added together and form the perimeter metric, as in $$P = \sum_{i}^{720} \sqrt{R_i^2 + R_{i+1}^2 - 2R_i R_{i+1}\cos(d\theta)} . \qquad (4)$$

The process of filtering out the tagged points $G_{TAGGED}$ is shown in the example of Algorithm 1, The pseudo code in Algorithm 3 shows an example of how the tagged values may be omitted from the perimeter calculation process.

3. Spectrum Analysis

Figure 4:
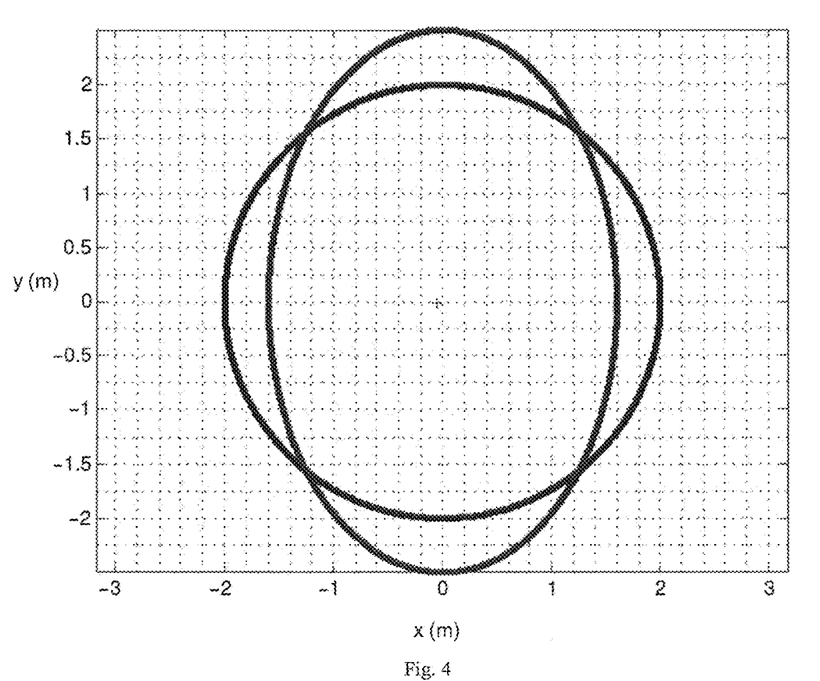
FIG. 4 shows an oval drift superimposed on a circular drift, where the ranges on the right and left of the centre are shorter, while the ranges on the top and bottom are elongated.

The spectrum analysis takes range values and calculates a Fast Fourier Transform (FFT) of the data. The idea is that the macroscopic changes in drift shape will be captured as amplitude spikes in the lower frequency range of the Fourier transform. If one thinks of a complete circular scan of the drift as a single period, it makes sense to consider the swelling of the walls as an addition of a range modulation that occurs twice in a single period. For example, FIG. 4 shows an oval drift superimposed on a circular drift, Where the ranges on the right and left of the centre are shorter, while the ranges on the top and bottom are elongated. This particular modulation constitutes a radius change of 0.25× cos(2θ). By taking the FFT of the difference in radii which make up these drifts, one can see a spike in the 2 Hz column of the FFT chart.

---
Algorithm 3 Implementation of the perimeter calculation with filtered points.
---

Input: R, $G_{TAGGED}$
Output: P
 1: function PERIMETER CALCULATION(R, $G_{TAGGED}$)
 2:    P ← 0                             ▷ Initialize perimeter variable
 3:    C ← 0                             ▷ Initialize counting variable
 4:    for i = 1 → 720 do
 5:       if i = Any($G_{TAGGED}$) then
 6:          C = C + 1    ▷ Count number of successive, un-TAGGED points

| Algorithm 3 Implementation of the perimeter calculation with filtered points. |
|---|
| 7:     else if i ≠ Any($G_{TAGGED}$) then          ▷ Sum perimeter |
| 8:         P = P + $\sqrt{R_i^2+R_{i+1}^2+\cos(d\theta \times C)}$ |
| 9:         C ← 0 |
| 10:    end if |
| 11: end for |
| 12: end function |

In order to take a FFT of the range data, the data must be conditioned to be symmetrical. What this means is that the range values cannot simply be put through a FFT function as they were taken. If the scan was taken away from the geometrical centre of the drift, this would induce frequency domain noise in the resultant data. Consider the circular drift shown in FIG. 4. Range data taken from the geometrical centre would appear to be a constant value, because the range is never changing. If the range vales were taken from near the base of the drift, the range data would look like the dotted line in FIG. 5.

Figure 5:
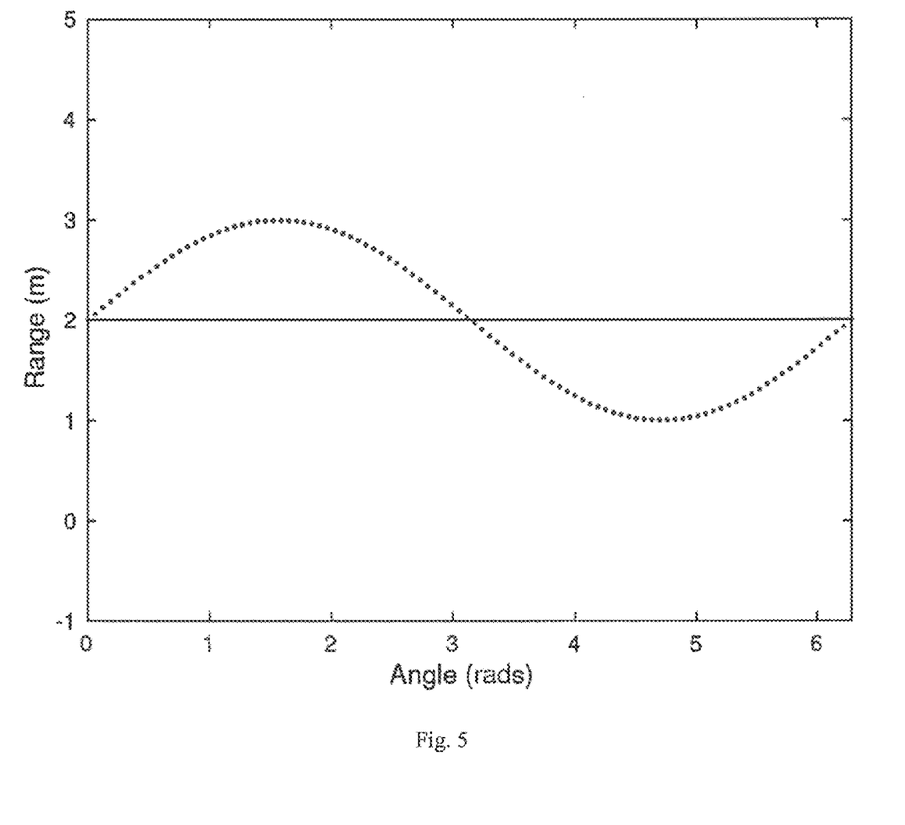
FIG. 5 is a plot showing radial distance scan data from a circular drift, where the solid line represents ranges from the origin and the dotted line represents ranges originating lower in the drift.

FIG. 5 shows a radial distance scan data from a circular drift. The solid line represents ranges from the origin while the dotted line represents ranges originating lower in the drift.

It is noticed that by not taking the range values with respect to the geometric centre, the circular drift would have an artificially induced 1 Hz sine wave in the signal data.

Even when the scan ranges are taken from the geometric centre of the drift, there is still another aspect to consider before taking the Fourier transform. A constant radius (in this case two-metres) constitutes what is known as DC bias in the Fourier transform. This manifests itself as very low frequency noise (near 0 Hz) in the frequency domain. To reduce this unwanted signal noise, the average value of the cross-sectional radii is computed and subtracted from all the range values. To illustrate this point, FIG. 6 shows the Fourier transform of the circular drift range data both with and without the aforementioned filtering steps.

Figure 6:
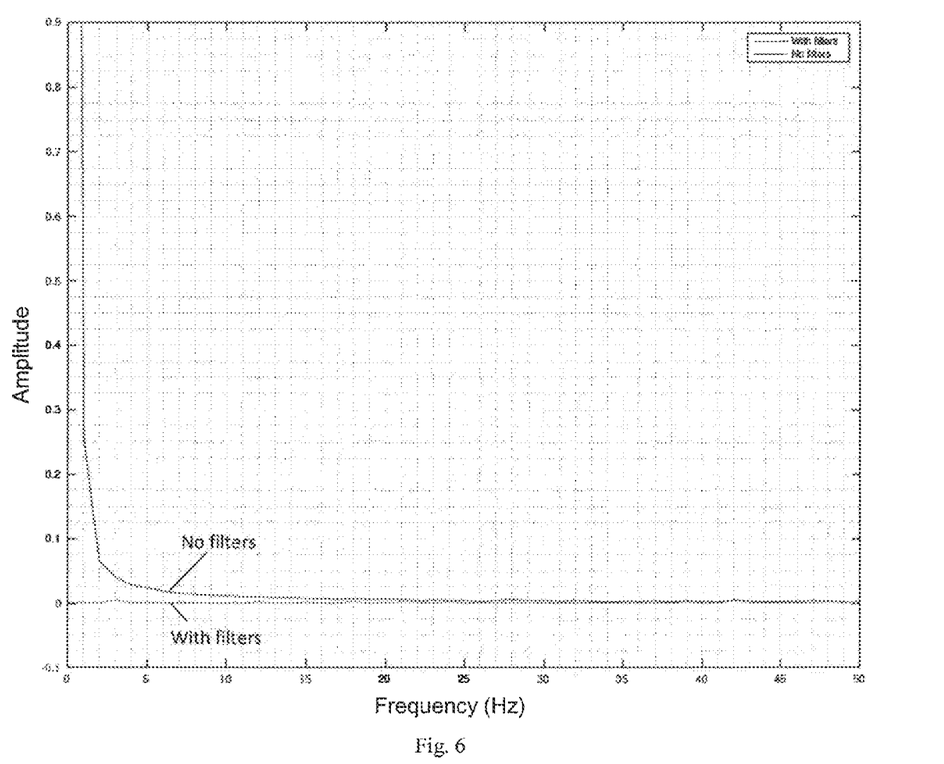
FIG. 6 is a plot of a Fast Fourier Transform of a circular drift, with filters and without filters.

FIG. 6 is a plot of a Fast Fourier Transform of the circular drift, with filters (i.e., the FFT resulting when the drift centre and average radius are accounted for), and without filters (i.e., showing the noise that the filtering eliminated).

This final manipulation of the range data allows the FFT to be taken. What follows is a practical explanation of how these steps were done.

In order to calculate the geometric centre of the data, one must first build a grid of fixed resolution representing the scan data so that differences in scan resolution around the drift do not affect where the geometric centre will be placed. This fixed resolution grid is referred to as an occupancy grid, and may be generated with the help of a variety of open source software packages. The geometric centre is calculated with a standard centre of mass formula, as in $$\bar{x} = \frac{1}{M_t}\sum_i m_i x_i \qquad (5)$$

$$\bar{y} = \frac{1}{M_t}\sum_i m_i y_i,$$

where $M_t$ is the number of unoccupied blocks, is the mass of each unoccupied block (set equal to 1) while $x_i$ and $y_i$ are the distances of that block from the origin in the x and y directions respectively.

With the geometric centre of the cross section evaluated, it is possible to calculate new range values from the centre of mass to the previously projected points. For the sake of clarity, let the initial range values be $R_{init}$ with Cartesian coordinates x and y while the range values with respect to the geometric centre shall be referred to as $R_C$. The range values $R_C$ will point from the centre of mass of the drift to the x and y points laid out from the $R_{init}$ range data.

The $R_C$ values are evaluated as $$x_C = x - \bar{x}$$

$$y_C = y - \bar{y}$$

$$R_C = \sqrt{x_C^2 + y_C^2} \qquad (6)$$

Next the average $R_C$ range is evaluated and subtracted from all $R_C$ values. This final signal data is fed into a FFT algorithm and the frequency amplitude information is generated.

4. Principal Component Analysis

Principal component analysis (PCA) is a tool that exposes the variance structure of data. In some embodiments, the analysis may include exposing a co-variance structure of the data. The PCA process outputs which "direction", such as an axis, in a set of data has the largest variance, followed by a linearly independent direction with next largest variance, and so on. In a two dimensional data set, like in the x and y cross sectional scan data, PCA will return two axes. The first axis, with the largest variance, will be the principal component. The second axis will be along the direction of least variance and will always be perpendicular (linearly independent) of the principal axis.

Put in the context of convergence detection, principal variance directions highlight in what direction the drift is expanding and in which direction is it converging. The correlation between variance and drift width exists because a set of data with points far from one another will inherently have a larger variance. Consider FIGS. 7A and 7B, with the lines indicating the principal component of each oval. The principal component output will always point to the direction of greatest variance, which in this case is the widest portion of the drift.

Figure 7A:
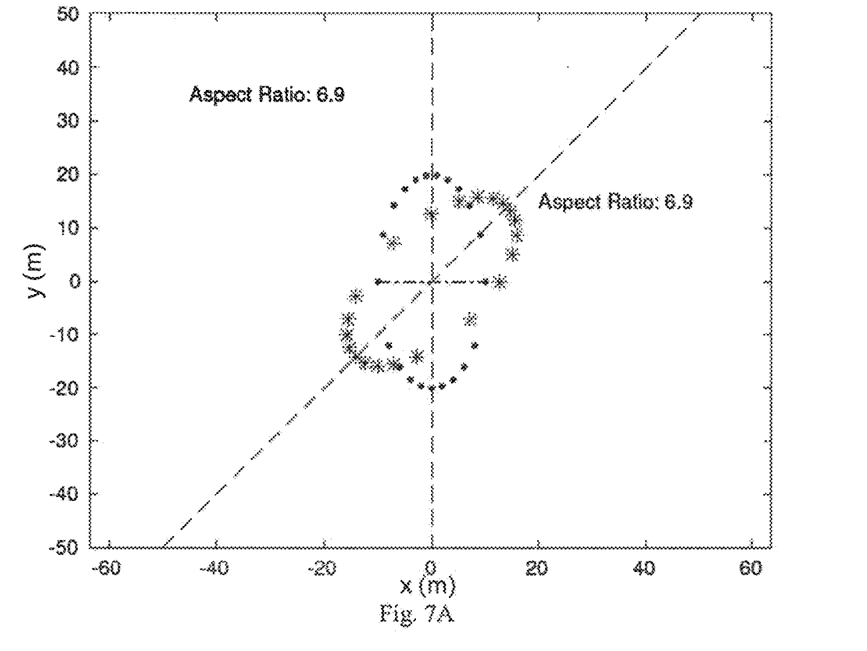
FIGS. 7A and 7B are plots showing principle component analysis results, where, in FIG. 7B, one point has been moved out of position relative to FIG. 7A.
Figure 7B:
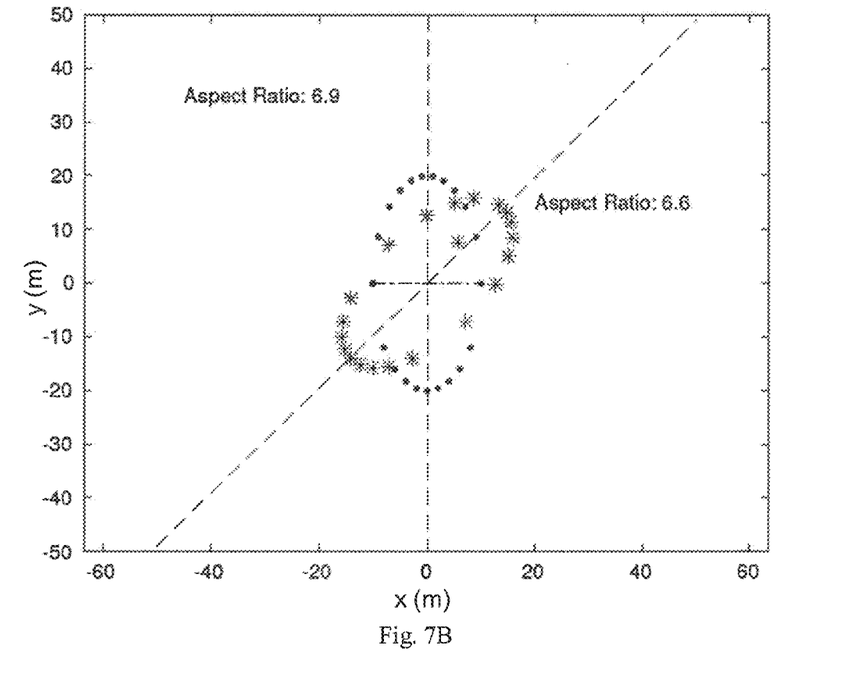

FIGS. 7A and 7B show the result of two PCA analyses. Both the primary direction of width and the magnitude of this width are shown. PCA uses co-variance matrices to find these quantities despite imperfections introduced, as in FIG. 7B.

Computing the principal component direction requires determining the eigenvalue of the x and y scan co-variance matrix. The co-variance matrix is $$M = \begin{bmatrix} \sigma_x^2 & \sigma_{xy} \\ \sigma_{xy} & \sigma_y^2 \end{bmatrix}. \qquad (7)$$

For this matrix, the variance $\sigma_x^2$ and co-variance $\sigma_{xy}$ are calculated as in Equation (8), where variable n is the number of samples and $\bar{x}$ and $\bar{y}$ are the average values of x and y. The average x and Y values for the drift will not represent the actual geometric centre of the drift because of differences of the scanner point density around the circumference of the drift. In this case, $\bar{x}$ and $\bar{y}$ are replaced by $x_C$ and $y_C$, the centre of mass coordinates computed above, namely $$\sigma_x^2 = \frac{1}{n-1} \sum_{i=1}^{n} (x_i - x_C)^2 \qquad (8)$$

$$\sigma_{xy} = \frac{1}{n-1} \sum_{i=1}^{n} (x_i - x_C)(y_i - y_C).$$

The eigenvalue of matrix M is defined as the determinant $$\det(M - \lambda I) = |M - \lambda I| = 0, \qquad (9)$$

where $\lambda$ is the desired eigenvalue matrix and I is the identity matrix.

Additionally, computing the principal component direction requires determining the eigenvector of the co-variance matrix M. An eigenvector x of matrix M must satisfy $$Ax = \lambda x. \qquad (10)$$

There exist recursive estimation models that calculate eigenvectors and their associated eigenvalues, as known in the art.

Convergence with PCA is measured as a ratio of the largest eigen value magnitude over the smallest eigenvalue magnitude. This metric may be described as the aspect ratio of the drift, since it is a ratio of two perpendicular measurements which describe the widest and narrowest sections of the drift.

By using all the scan points for this calculation, it is expected that most sparsely populated outlier points will have little influence over the PCA output. The theory is that a change in the overall shape of the drift will have a greater effect on the PCA aspect ratio than any small group of anomalous data points. Consider the example in FIG. 7B, where one point has been moved out of position from FIG. 7A. The overall direction of the PCA vector is unaffected, while the magnitude of the primary component changes by only 5%.

5. Phase Angle

Phase angle is a term used when discussing the misalignment of periodic signals. In the context of this convergence monitoring algorithm, phase disruption refers to angular misalignment of cross sectional scans. This indicator is not used directly in the indicator amalgamation to determine convergence, however it is a natural by-product of the principle component analysis. The phase angle is included because it may be used after the convergence detection algorithm to determine in what direction the drift is experiencing convergence.

Figure 8A:
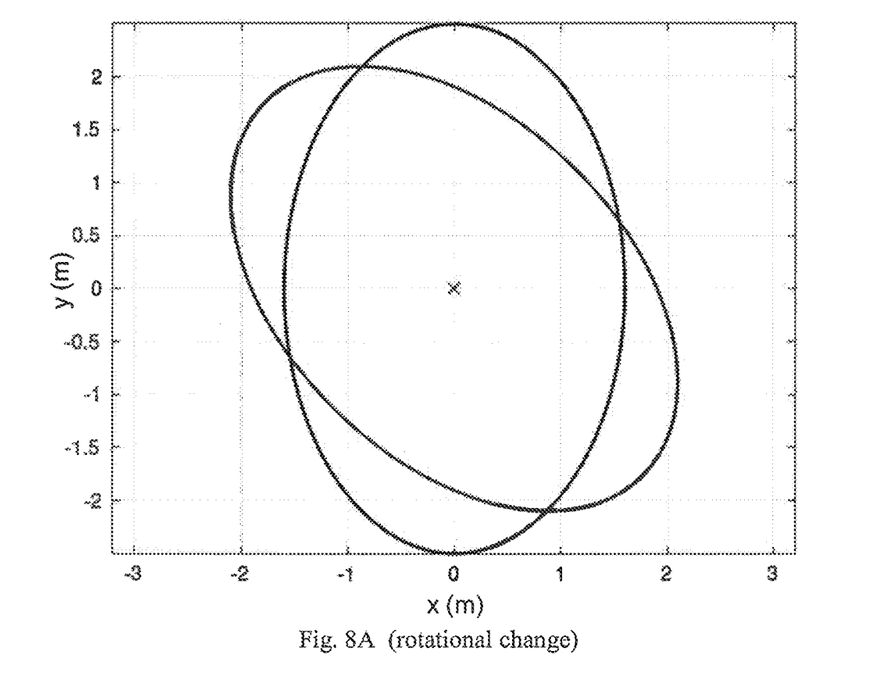
FIG. 8A is a plot showing cross sections of two drifts that differ from each other by a rotation of $$\frac{\pi}{4}$$
Figure 8B:
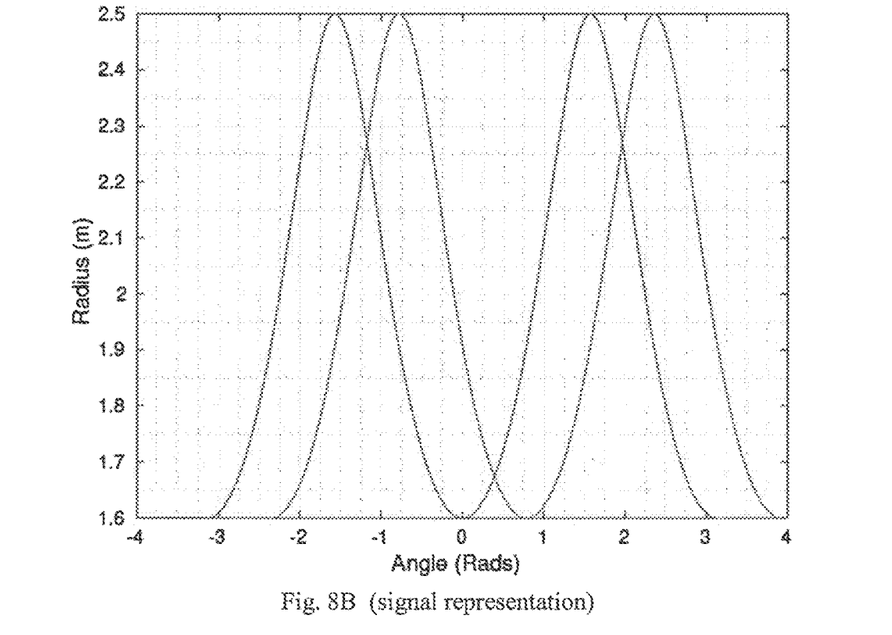
FIG. 8B shows range data with respect to scan angle for the two drifts.

To illustrate how phase shifts correlate to directions of convergence in a drift, consider the cross sections presented in FIGS. 8A and 8B. FIG. 8A shows the cross section of two drifts. Each drift only differs from the other by a rotation of $$\frac{\pi}{4}$$

radians. FIG. 8B shows the range data with respect to scan angle. It can be seen that a rotational change in the drift cross sections will tend to manifest as a phase change in the scan data. This type of change could occur in a drift as a result of uneven loading in the rock mass caused, for example, by introducing new excavations.

The direction of the principal component may be calculated by taking the arctangent of the principal eigenvector—the one with the largest associated eigenvalue. With this, successive scans can compare the direction of their principal component vectors.

Bayesian Amalgamation

In an idealized scenario, each of the four indicators would perfectly identify convergence. In other words, it would be possible to determine the convergence magnitude with high accuracy, with the indicator measurements never deviating from the actual convergence of the drift. In practice, this is not the case. Sometimes the indicators are confronted with a drift scan that causes some anomalous spike in value. These errors can be caused by any number of factors. Errors such as a laser beam refracting away from the range sensor or being absorbed by the material would, for example, cause false (large) range values to be measured. Conversely, dirt on the sensor or dust clouds surrounding the area could cause artificially small laser range values. Since filtering is often not perfect, use of only a single indicator could allow an occasional miscalculation of that value to influence the estimate of drift convergence, even if the value makes no practical sense. For these reasons, a model such as a Bayesian Network (BN) or directed graphical model is used to amalgamate information from the multiple indicators in order to derive an estimate of the probability of convergence.

Figure 9:
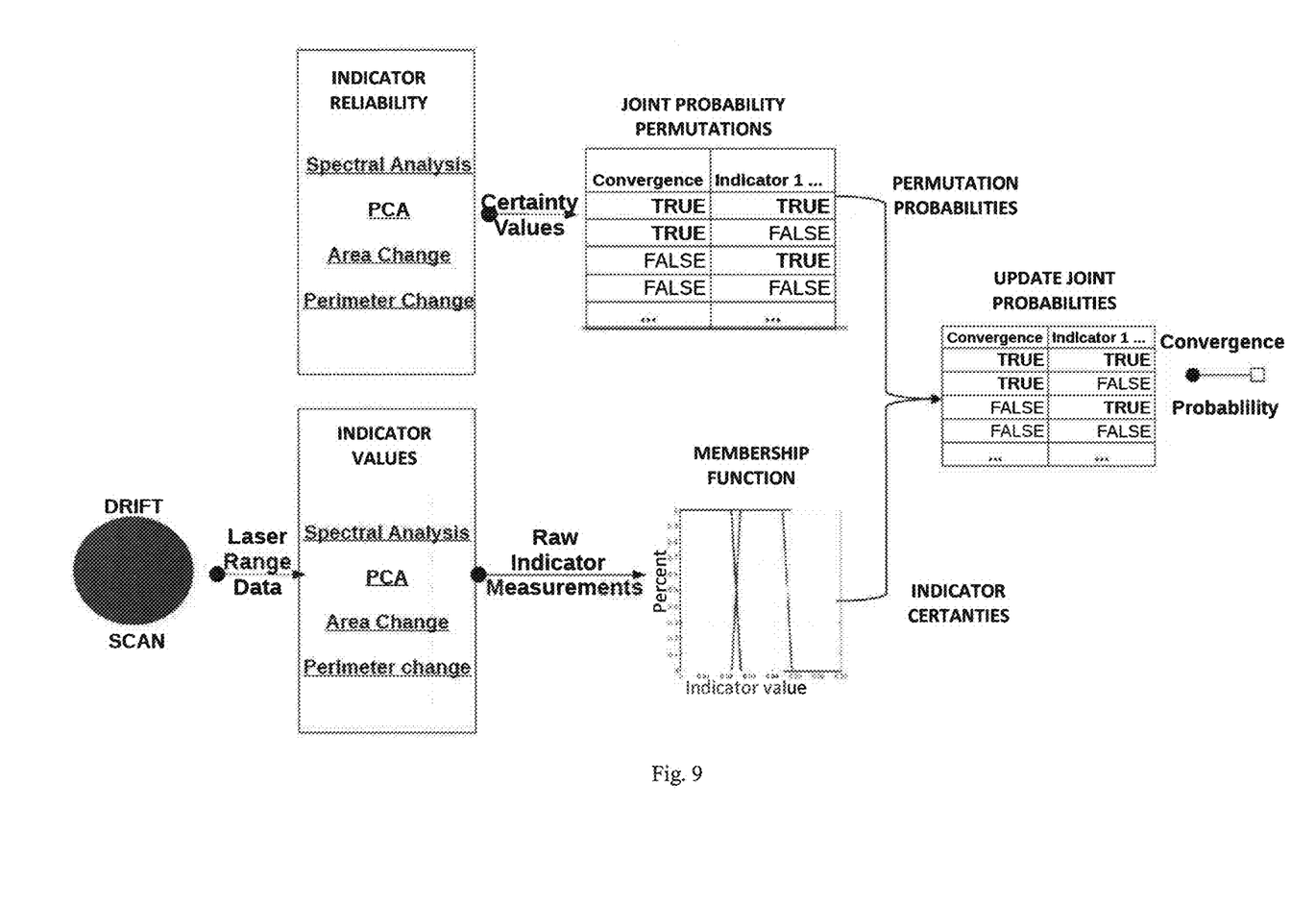
FIG. 9 is a flowchart showing how convergence indicators are amalgamated to produce a final probability of convergence.

The following sections first outline how the BN is set up, followed by an explanation for how the BN probabilities are updated. The flow chart in FIG. 9 provides a high-level overview of how the convergence indicators are amalgamated to produce the final probability of convergence.

1. Initialization

Figure 10:
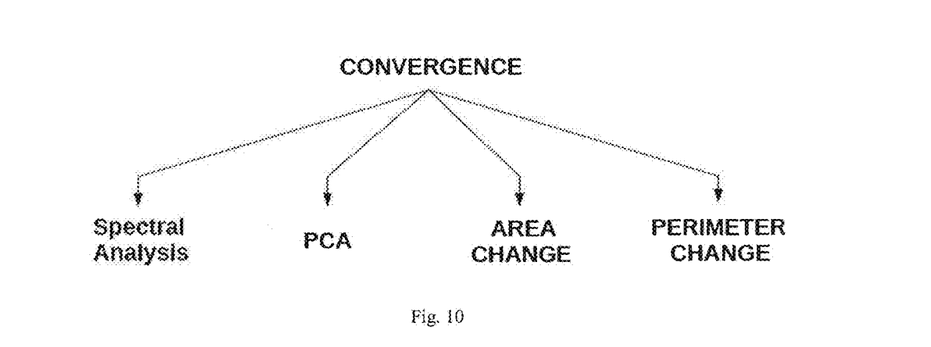
FIG. 10 is a directed acyclic graph (DAG) showing a relationship between convergence and multiple computed indicators.

In this convergence detection algorithm, convergence is inferred from multiple computed indicators. FIG. 10 shows this implicative relationship in the form of a directed acyclic graph (DAG) between convergence and the aforementioned indicators. Other network configurations are also possible. The indicators are caused by convergence occurring. The change in indicator values serve as the tests for either confirming or negating the probability of convergence. Determining convergence from these tests is a form of conditional probability: $P(C|T_1, T_2, T_3, T_4)$.

In this specific instance of the algorithm, each node is given three states: 1) high; 2) low; and, 3) negligible. For example, the convergence node will indicate either high, low, or negligible convergence while the indicator nodes will show measurements consistent with either high, low, or negligible convergence. These measurements are derived from laser scans of underground cross sections as described above, which are then passed into membership functions (MF) such as one that assigns variable values x-axis a compatibility value for any proportion of two out of the three states.

Figure 11:
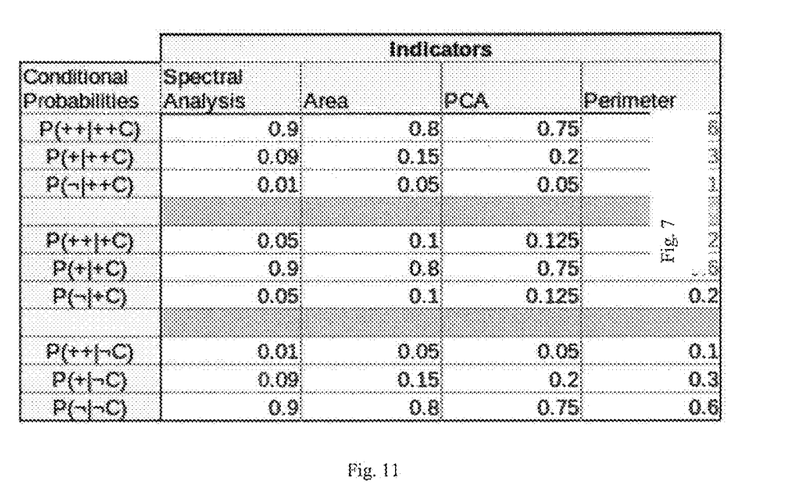
FIG. 11 is a table showing initial conditional probabilities for respective accuracies of convergence indicator tests.

Firstly, before measuring the drift, the reliability of each indicator is considered and assigned a value from 0 to 1. These values are comparable to false negative rates. Having three possible states, however, necessitates a slightly larger number of conditional statements. These are summarized in FIG. 11, which shows the initial conditional probabilities surrounding the respective accuracies of the convergence indicator tests. The symbols in the figure are ++, +, and   for high, low, and negligible convergence respectively.

In practice, these values may be assigned by studying acquired data, using the experience of a qualified practitioner of the system or through supervised learning algorithms which evolve the probabilities based on known data. These are simply preliminary numbers for the sake of explaining the BN amalgamation.

According to the law of total probability, the sum of every conditional probability of any one indicator state must be one, since that represents all the possible pet mutations of that state; as in $$1 = \sum_n P(++_{SA} \mid C_n) \quad (11)$$

where $C_n$ can be ++C, +C, or  C.

The sum of the probabilities of the states of each variable must equal 1. In other words, $P(+_{indicator}|C)$ and $P(-_{indicator}|C)$ must sum to 1, since these two states for the indicator represent all possible options, as in $$P(+_{SA} \mid C) = 0.95$$
$$P(-_{SA} \mid C) = 0.05$$
$$\vdots$$
$$P(+_{SA} \mid \neg C) = 0.05$$
$$P(-_{SA} \mid \neg C) = 0.95$$
$$\vdots$$

Note that the probabilities for the convergence indicators reading negligible convergence are equivalent to those reading positive convergence, since errors favouring positive or negative test results are not expected, as in $$P(++_{SA} \mid ++C) = P(++SA \mid +C) = P(++_{SA} \mid \neg C) \quad (12)$$
$$P(+_{SA} \mid ++C) = P(+SA \mid +C) = P(+_{SA} \mid \neg C)$$
$$\vdots$$

These reliability values are then used to calculate the probabilities of different permutations in a joint probability permutation table (JPT). Each permutation is known as a world and has a probability of existing given the state and associated reliability of each variable in that world. These joint probabilities serve to weight the reliability of the indicators against themselves. For example, a JPT that has 3 variables with 2 possible states, has a total of 8 permutations. This relationship can be summarized as $$n_{worlds} = (n_{states})^{n_{variables}} \quad (13)$$

The conditional probability $P(C|T_1, T_2, T_3, T_4)$ has 5 variables which can occupy 3 different states. Therefore, the JPT must have 243 worlds.

Figure 12:
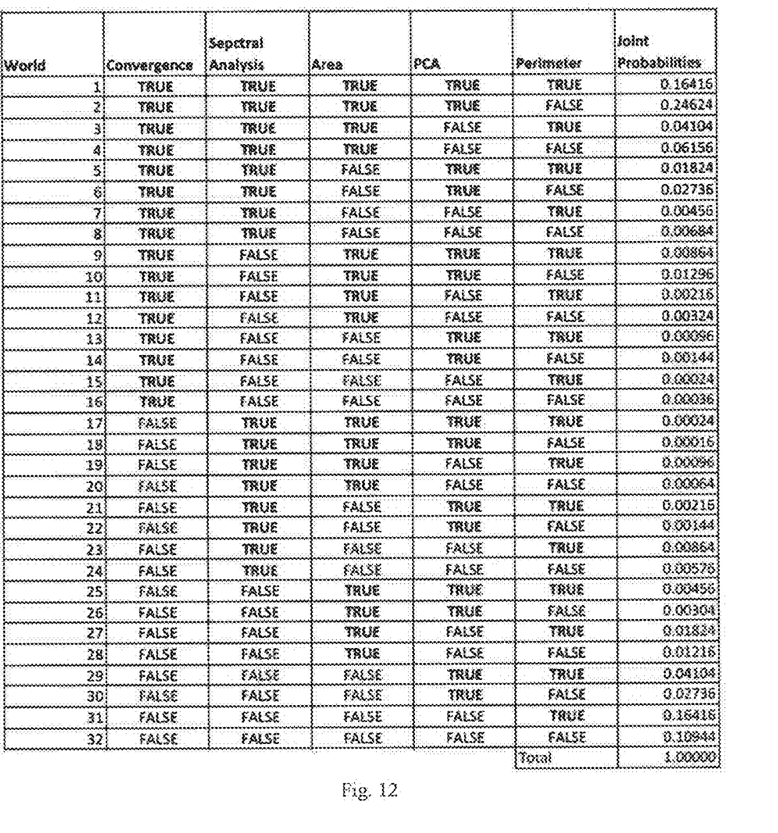
FIG. 12 is an example of a five-variable joint probability permutation (JPP) table with each variable having two possible states (true, false).

An example of a five-variable joint probability permutation (JPP) table with each variable having two possible states (true or false) is shown in FIG. 12.

Calculating joint probabilities of causal structures can be very complicated, but in this Bayesian network example the causal structure is less complex. This is because all of the convergence indicators are assumed to be independent of one-another, as implied by the structure of the DAG in FIG. 10, This is, to begin with, a reasonable assumption because the results of one drift indicator are not affected by the results of another indicator. The only factor influencing any change in the indicators should either be convergence, or some factor of noise caused by an issue similar to the ones stated above. Due to this independence, the joint probability of any world can be calculated as the product of its reliability, given the state of those variables in that world. For example, $$JP_{world1} = P(+_{SA} \mid C) \times P(+_{PCA} \mid C) \times P(+_A \mid C) \times P(+_P \mid C) \times P(C)$$
$$JP_{world2} = P(+_{SA} \mid C) \times P(+_{PCA} \mid C) \times P(+_A \mid C) \times P(-_P \mid C) \times P(C)$$
$$\vdots$$
$$JP_{world18} =$$
$$P(+_{SA} \mid \neg C) \times P(+_{PCA} \mid \neg C) \times P(+_A \mid \neg C) \times P(-_P \mid \neg C) \times P(\neg C)$$
$$JP_{world19} =$$
$$P(+_{SA} \mid \neg C) \times P(-_{PCA} \mid \neg C) \times P(+_A \mid \neg C) \times P(+_P \mid \neg C) \times P(\neg C)$$
$$\vdots$$

Note how a world with certain false variables uses the probability that the variable is false; as in $P(-_P|C)$ in world 2. Additionally, if convergence is false in a world, the probabilities used must reflect this—as with $P(+_P| C) \ldots$ in world 18 (see FIG. 12). This pattern continues for the joint probabilities of all the worlds.

This example (FIG. 12) has 32 possible permutations or worlds. The number of possible worlds depends on both the number of variables and on how many states each variable can have. The relationship can be summarized as follows $$n_{worlds} = (n_{states})^{n_{variables}} \quad (14)$$

The JPP table used in the final algorithm has the same five variables shown in FIG. 12 but with each variable possibly occupying one of three states—high, low, and negligible convergence. Now there are 243 possible worlds with probability values for each variable, having three states each. Note that the sum of all the variable states for one state of convergence must still equal 1, as in $$P(high_{SA} \mid high_C) + P(low_{SA} \mid high_C) + P(none_{SA} \mid high_C) = 1$$
$$P(high_{SA} \mid low_C) + P(low_{SA} \mid low_C) + P(none_{SA} \mid low_C) = 1$$
$$P(high_{SA} \mid none_C) + P(low_{SA} \mid none_C) + P(none_{SA} \mid none_C) = 1$$
$$\vdots$$

Additionally, the sum of all the joint probabilities must also equal 1, as in FIG. 12.

2. Indicator Amalgamation

The derivation of a joint probability table may be independent of the actual convergence monitoring measurements. This means that it may be modified and generated in advance as a look-up table.

Returning to the workflow presented in FIG. 9, once the reliability of each indicator is considered and added to the joint probability table, these probabilities are updated with compliance values from the membership function.

The membership function is calibrated based on experimental data for each indicator. The purpose of the MF is to assign an indicator value into banks corresponding to linguistic variables representing high, low, or negligible convergence. The membership function also assigns the probability that that indicator value is a member of that MF bank. In this way, the membership function weighs the certainty of any one indicator's claim to represent one of the three states of convergence.

The MF outputs may then be used to update the JPT using a three state equation, as in:

$$P'(\omega_k) = \begin{cases} \frac{q_{++\beta}}{P(++\beta)} P(\omega_k), & \text{if } \omega_k \models ++\beta \\ \frac{q_{+\beta}}{P(+\beta)} P(\omega_k), & \text{if } \omega_k \models +\beta \\ \frac{q_{\neg\beta}}{P(\neg\beta)} P(\omega_k), & \text{if } \omega_k \models \neg\beta \end{cases} \quad (15)$$

where β can be any one of the indicators.

The intended outcome from applying such a method is to balance evidence and determine what level of convergence is actually occurring, despite general uncertainty with respect to the measurements and the implied uncertainty of the linguistic variables.

The percent likelihood of either of these levels of convergence is determined from the joint probability lookup table by summing those worlds where convergence is either high, low or negligible, as in:

$$P(C|\beta) = \sum_k \omega_k \quad \omega_k \models \beta \quad (16)$$

where C and β can be in any one of the three available states and β can incorporate all four indicator states.

This probability update holds true for the three-state example for as long as the sum of q-values in Equation (15) equal 1, as in $$q_{++\beta} + q_{+\beta} + q_{\neg\beta} = 1. \quad (17)$$

This renders the system "sum normal", meaning that it covers all possible outcomes of the system. As a result, the sum of all the worlds, ω, will still equal 1 after all the manipulations.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. Apparatus for detecting tunnel convergence; comprising:
    at least one platform including at least one scanning device that is configured to acquire 3D point cloud data of an interior of the tunnel;
    a processor that:
    determines a set of one or more indicators from 3D point cloud data for the tunnel acquired at a first time;
    identifies the set of one or more indicators in 3D point cloud data for the tunnel acquired at at least a second time;
    amalgamates the sets of one or more indicators;
    compares the indicators in the amalgamated sets at the first and at least second times; and
    outputs a result indicative of a change or no change in one or more indicators since the first time.

2. The apparatus of claim 1, wherein the platform is adapted to be attached to a vehicle.

3. The apparatus of claim 1, wherein the platform is self-propelled.

4. The apparatus of claim 3, wherein the platform is adapted to be guided through the tunnel using remote control or autonomously.

5. The apparatus of claim 1, wherein the at least one scanning device comprises a laser scanning device.

6. The apparatus of claim 1, wherein the at least one scanning device comprises a rangefinder device.

7. The apparatus of claim 1, wherein the tunnel is associated with a mine.

8. A non-transitory computer-readable medium for detecting tunnel convergence, comprising instructions stored thereon, that when executed on a processor, perform one or more steps selected from:
    inputting 3D point cloud data of an interior of a tunnel;
    determining a set of one or more indicators from the 3D point cloud data for the tunnel acquired at a first time;
    identifying a set of one or more indicators in the 3D point cloud data for the tunnel acquired at at least a second time;
    amalgamating the sets of one or more indicators;
    comparing the indicators in the amalgamated sets at the first and at least second times; and
    outputting a result indicative of a change or no change in one or more indicators since the first time.

9. The non-transitory computer-readable medium of claim 8, wherein the processor amalgamates each set of indicators according to a directed graphical model.

10. The non-transitory computer-readable medium of claim 8, wherein the processor amalgamates each set of indicators according to a Bayesian model.

11. The non-transitory computer-readable medium of claim 8, wherein the output comprises a probability that tunnel convergence has occurred.

12. A method for detecting tunnel convergence; comprising:
    acquiring 3D point cloud data of an interior of the tunnel;
    using a processor to:
    determine a set of one or more indicators from 3D point cloud data for the tunnel acquired at a first time;
    identify the set of one or more indicators in 3D point cloud data for the tunnel acquired at at least a second time;
    amalgamate the sets of indicators;
    compare the indicators in the amalgamated sets at the first and at least second times; and
    output a result indicative of a change or no change in one or more indicators since the first time.

13. The method of claim 12, comprising amalgamating each set of indicators according to a directed graphical model.

14. The method of claim 12, comprising amalgamating each set of indicators according to a Bayesian model.

15. The method of claim 12, comprising outputting a probability that tunnel convergence has occurred.

16. The method of claim 12, comprising deploying at least one platform including at least one scanning device that is configured to acquire 3D point cloud data of an interior of the tunnel.

17. The method of claim 16, comprising attaching the platform to a vehicle.

18. The method of claim 16, wherein the platform is self-propelled.

19. The method of claim 18, comprising guiding the platform through the tunnel autonomously or using remote control.

20. The method of claim 16, comprising using at least one laser scanning device.

21. The method of claim 16, comprising using at least one rangefinder device.

22. The method of claim 12, wherein the tunnel is associated with a mine.

* * * * *